Feb. 24, 1959  H. C. ROHR ET AL  2,874,770
SELF-SUPPORTING BLIND
Filed July 15, 1955  2 Sheets-Sheet 1
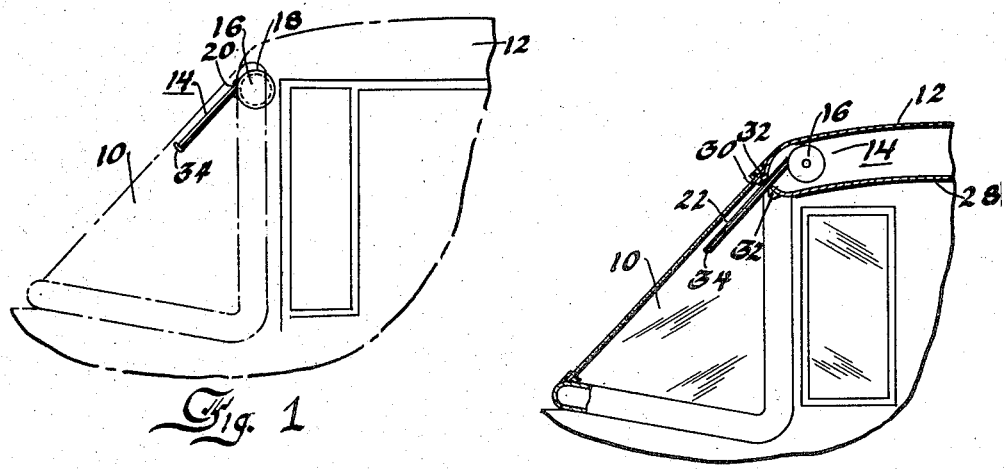
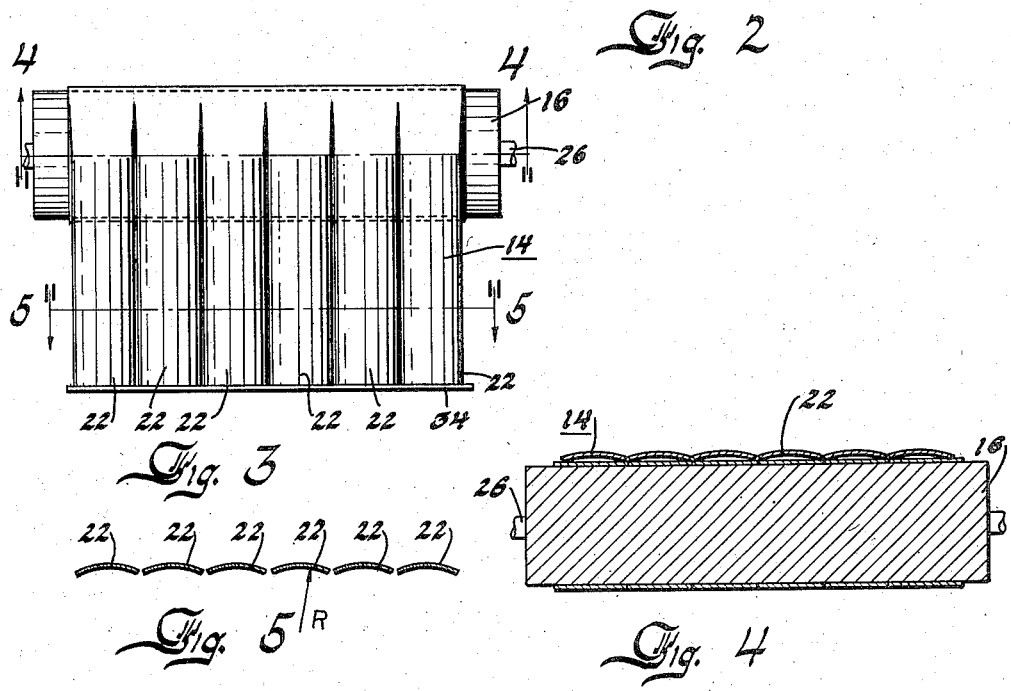
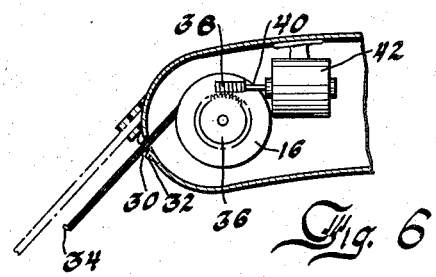
INVENTOR.
HENRY C. ROHR
BY CYRIL T. WALLIS
Their Attorney Feb. 24, 1959 H. C. ROHR ET AL 2,874,770
SELF-SUPPORTING BLIND Filed July 15, 1955 2 Sheets-Sheet 2

INVENTOR.
HENRY C. ROHR
BY CYRIL T. WALLIS

Their Attorney

United States Patent Office 2,874,770
Patented Feb. 24, 1959

2,874,770
SELF-SUPPORTING BLIND

Henry C. Rohr, Rochester, and Cyril T. Wallis, Brockport, N. Y., assignors to General Motors Corporation, Detroit, Mich., a corporation of Delaware Application July 15, 1955, Serial No. 522,283

2 Claims. (Cl. 160—23)

This invention pertains to blinds, and particularly to a self-supporting blind that can be rolled up for storage.

Blinds heretofore developed have fallen into three general categories, namely: the roller shade type, which is not self-supporting; the Venetian blind type, which is not self-supporting; and the rigid type, such as presently incorporated in vehicles as sun visors. The present invention relates to a self-supporting blind of the flexible type so that the blind may be rolled up for storage. Moreover, although in the disclosed embodiment, the blind is used as a vehicle sun visor, this is only exemplary and is not to be construed as a limitation. Accordingly, among our objects are the provision of a self-supporting blind constructed so that it may be rolled up; the further provision of a flexible self-supporting blind; and the still further provision of a self-supporting blind including power means for rolling and unrolling the same.

The aforementioned and other objects are accomplished in the present invention by utilizing a plurality of flexible plastic strips, or metal strips, the transverse cross-section of each strip comprising an arc, or arch. Specifically, it is a well recognized fact that a length of flexible metal, or plastic, having a transverse arcuate cross-section will flatten out when curved longitudinally at a radius substantially equal to the radius of the arcuate cross-section. Thus, a flexible metal strip of transverse arcuate cross-section may be rolled up for storage. The radius of the storage roller is important in that if the radius is too small, the flexible strip will be permanently deformed. However, when the strip is coiled about a roller having a radius substantially equal to the radius of its transverse arc, or arcs, it will not be permanently deformed, and when unrolled, it will straighten out and become self-supporting.

Accordingly, in a motor vehicle installation, the roller can, if desired, be concealed in the roof and the blind can be accessible through a guide slot. Moreover, the blind can be actuated by power means, such as an electric motor, a solenoid, an air motor, or a vacuum motor. In the disclosed embodiment, the power means comprises a reversible electric motor.

In one embodiment the blind comprises a plurality of strips having contiguous longitudinal edges, which blind is made from an integral sheet which is thereafter separated into strips. In a second embodiment, the blind comprises a plurality of spaced arcuate strips having a fabric covering thereover.

Further objects and advantages of the present invention will be apparent from the following description, reference being had to the accompanying drawing wherein preferred embodiments of the present invention are clearly shown.

In the drawing:

Fig. 1 is a fragmentary view, in elevation, of a vehicle equipped with the self-supporting blind of this invention, the storage roller being disposed in the passenger compartment.

Fig. 2 is a fragmentary view, partly in section and partly in elevation, of a vehicle equipped with the self-supporting blind with the storage roller concealed in the roof.

Fig. 3 is an enlarged fragmentary view, in elevation, of the self-supporting blind and storage roller therefor.

Fig. 4 is a sectional view taken along line 4—4 of Fig. 3.

Fig. 5 is a sectional view taken along line 5—5 of Fig. 3.

Fig. 6 is a fragmentary sectional view of a vehicle in which the self-supporting blind of this invention is actuated by power means.

Figure 7:
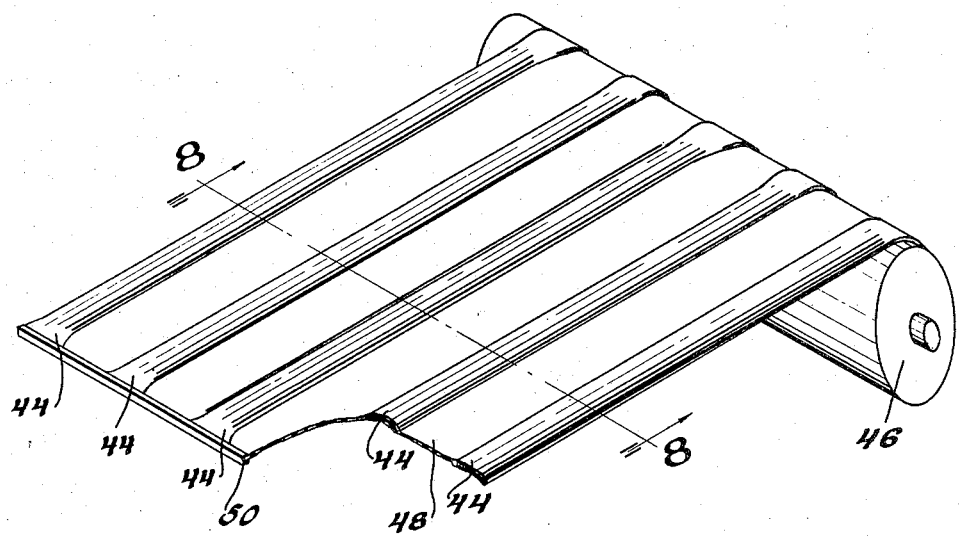
Fig. 7 is a fragmentary view, in elevation, of a modified blind construction.

With particular reference to Fig. 1, the vehicle is shown having a windshield 10 and a roof 12. The vehicle is shown including a self-supporting blind 14, which constitutes the sun visor, the blind being constructed according to this invention. The blind 14 includes a storage roller 16, which is mounted adjacent the top of the windshield 10, the roller being enclosed by a stationary casing 18 having a longitudinally extending guide slot 20.

With particular reference to Figs. 3 through 5, in one embodiment the self-supporting blind construction comprises a plurality of resiliently flexible metal, or plastic, strips 22, the inner ends of which are suitably fastened to the roller 16. The transverse cross-section of each strip comprises an arc, or arch, in the unrolled condition, and the longitudinal edges of the strips are contiguous. It is specifically pointed out that the strips 22 can be formed in an integral sheet and thereafter cut into strips. The radius of each arcuate strip 22 is the same, and is denoted by the radius line R in Fig. 5. It is a well recognized fact that a strip of resiliently flexible material, the transverse cross-section of which comprises an arc having a radius R, will flatten out to form a planar strip when coiled about a roller having radius substantially equal to the radius R. Moreover, when such a strip is coiled about a roller, the strip will not be permanently deformed, and when unrolled, will be completely self-supporting. Naturally, when the strip is coiled about a roller, the width thereof increases slightly since the chord of the arc is less than the perimetral length thereof.

This principle is utilized in the self-supporting blind construction of this invention. Thus, the radius of the roller 16 is substantially equal to the radius of each arcuate strip 22. Thus, when the blind 14 is coiled around the roller 16, the width thereof increases, as depicted in Fig. 3, since the arches flatten out. The roller 16 is supported within the casing 18 by a suitable shaft 26. The longitudinal slot 20 of the casing 18 constitutes a guide for determining the angular relationship of the blind in its unrolled position with respect to the windshield 10.

With particular reference to Fig. 2, the roller 16 is concealed between the roof 12 of the vehicle in the interior upholstery 28, while the guide slot 30 is formed in the interior molding 32 of the windshield 10. Preferably, the lower ends of the flexible strips 22 are attached to a bead 34, which has a larger width than the guide slots to provide a gripping surface by which the vehicle operator may grasp the flexible blind 14 so as to roll and unroll the same.

With particular reference to Fig. 6, a modified embodiment is disclosed wherein the roller 16 has attached thereto a worm gear 36, which meshes with a worm 38 formed on the end of the shaft 40 of a reversible electric motor 42. In this embodiment, the self-supporting blind 14 may be rolled and unrolled by energizing the motor 42, it being understood that the motor 42 is connected by wires through a source of electric current, not shown, and a suitable two-way switch, not shown, is employed to energize the motor 42 for rotation in either direction. Moreover, the roller 16 may be mounted in a casing, such as depicted in the Fig. 1 embodiment, rather than in the roof.

Figure 8:
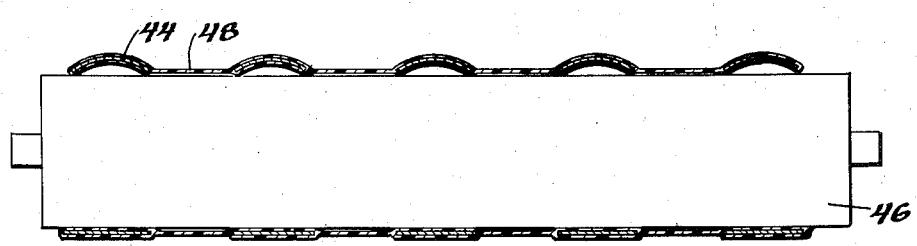
Fig. 8 is a sectional view taken along line 8—8 of Fig. 7.

With reference to Figs. 7 and 8, a modified blind construction is depicted, wherein a plurality of spaced, self-supporting flexible arcuate strips 44 of metal or plastic, have their inner ends attached to a roller 46. A covering 48, of any suitable fabric or plastic, is secured to each strip, the covering 48 being supported by the strips 44. Preferably, the covering is opaque and is also secured to a bead 50 attached to the outer ends of the strips 44.

From the foregoing, it is readily apparent that the present invention provides a unique self-supporting blind which may be readily concealed when not in use. Moreover, the self-supporting blind of this invention is particularly adapted for use as a motor vehicle sun visor, and when used as suggested, may be actuated by any suitable power means so that the blind may be moved from a storage position to a shielding position without manual effort on the part of the operator.

While the embodiment of the present invention as herein disclosed, constitutes a preferred form, it is to be understood that other forms might be adopted.

What is claimed is as follows:

1. A self-supporting blind comprising, a plurality of spaced apart resiliently flexible strips, the transverse cross-section of each strip comprising an arc, a roller to which the inner ends of said strips are attached having a radius substantially equal to the radius of said arc whereby said strips may be coiled about said roller to form a planar cross-section, means extending transversely of said strips and continuously engaging said strips adjacent the roller for determining the angular position thereof when uncoiled, and a covering adhesively attached to said strips and supported thereby.

2. The self-supporting blind set forth in claim 1 including means connecting the outer ends of said strips.

References Cited in the file of this patent

UNITED STATES PATENTS

| | | | |
|---|---|---|---|
| 1,448,016 | Welshansen | Mar. 13, | 1923 |
| 1,735,699 | Shelton | Nov. 12, | 1929 |
| 1,969,916 | Van Alstyne | Aug. 14, | 1934 |
| 2,098,020 | Wheeler | Nov. 2, | 1937 |
| 2,204,739 | Wells | June 18, | 1940 |
| 2,350,287 | Michelman | May 30, | 1944 |
| 2,528,325 | Valpey | Oct. 31, | 1950 |
| 2,572,257 | Gerner et al. | Oct. 23, | 1951 |
| 2,667,218 | Collins | Jan. 26, | 1954 |